(No Model.)
S. H. SHORT.
SWITCH FOR ELECTRIC CAR MOTORS.
No. 456,254. Patented July 21, 1891.
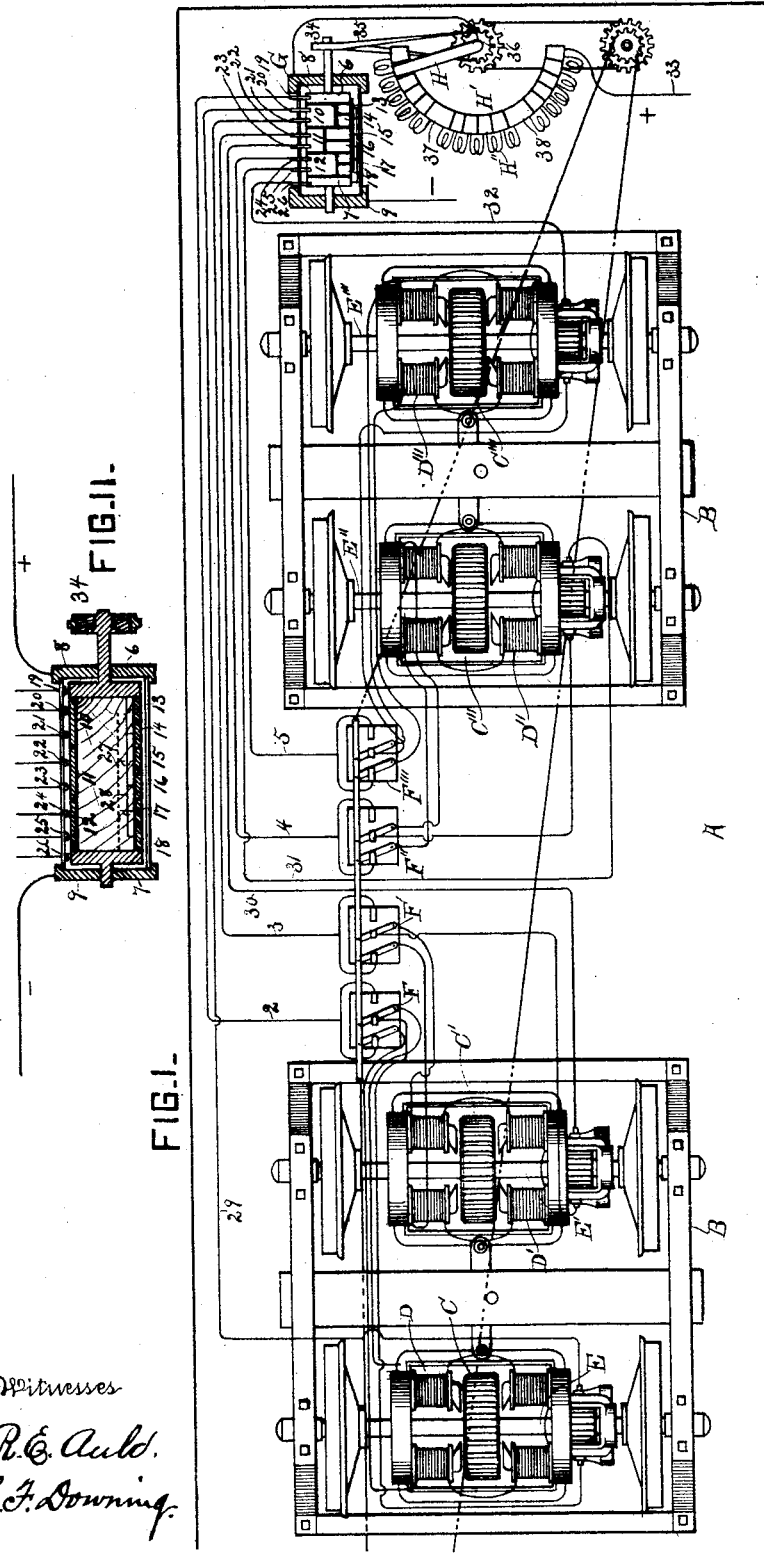
Witnesses
R. E. Auld.
G. F. Downing.
Inventor
S. H. Short.
By M. A. Seymour
Atty.

UNITED STATES PATENT OFFICE.

SIDNEY H. SHORT, OF CLEVELAND, OHIO.

SWITCH FOR ELECTRIC-CAR MOTORS.

SPECIFICATION forming part of Letters Patent No. 456,254, dated July 21, 1891.

Application filed April 7, 1891. Serial No. 388,006. (No model.)

*To all whom it may concern:*

Be it known that I, SIDNEY H. SHORT, of Cleveland, in the county of Cuyahoga and State of Ohio, have invented certain new and useful Improvements in Switches for Electric-Car Motors; and I do hereby declare the following to be a full, clear, and exact description of the invention, such as will enable others skilled in the art to which it appertains to make and use the same.

This invention relates more particularly to switches for the motors of an electric-car having bogie-trucks with two or more motors to each truck, but each of the improvements is included for all the uses to which it may be adapted.

The invention can most conveniently be explained in connection with the accompanying drawings, which form part of this specification.

Figure I is a diagram illustrating a bogie-truck electric car provided with motors and switches in accordance with the present invention. Fig. II is a detail view of one of the switches, and Fig. III is a view showing a somewhat different arrangement of contacts on the same switch.

As shown, the car A is provided with two bogie-trucks B B′, which are each provided with a motor for each of its two axles, said motors being coupled directly to said axles; but the invention is also applicable to geared motors of any suitable description. The armatures C C′ C″ C‴ of the respective motors are shown as mounted fast each upon a car-axle E or E′ or E″ or E‴, and the corresponding field-magnets D or D′ or D″ or D‴ are journaled on said axle and held from rotation by a connection with the frame of truck B or B′. The armature and field-magnets of each motor are in series with each other and the several magnets of each field are in series with one another, but the invention is not limited to these relations. It extends as well to motors in general irrespective of the relation of armature to field or of field-magnets to one another. In the wire 2 or 3 or 4 or 5 of each motor is placed a reversing-switch F or F′ or F″ or F‴, which, as shown, is arranged to reverse the current in the field-magnets, but may be arranged to reverse the current in the armature, as well understood by those skilled in the art.

The motors are each connected with a commutating-switch G, whereby they are adapted to be put in series, in multiple series, or in parallel with each other. The details of this switch are not important here. As shown in Figs. I and II, it comprises a non-conducting body with metallic ends 6 and 7 journaled in metallic bearings 8 and 9 and a number of circuit-changing plates 10 to 18, inclusive, and brushes 19 to 26, inclusive. The plates 10, 11, and 12 are insulated from one another, from the ends 6 and 7, and from the other plates. The plates 13, 15, and 17 are insulated from the other plates and from the end 6, but are electrically connected by a conductor 27 with one another and with the end 7. The plates 14, 16, and 18 are insulated from the other plates and from the end 7, but are electrically connected by the conductor 28 with one another and with the end 6. The wires 2 and 29 are respectively connected with the brushes 19 and 20 and form a loop, which includes the motor C D. The wires 3 and 30 are respectively connected with the brushes 21 and 22 and form a loop, which includes the motor C′ D′. The wires 4 and 31 are respectively connected with the brushes 23 and 24 and form a loop, which includes the motor C″ D″. The wires 5 and 32 are respectively connected with the brushes 25 and 26 and form a loop, which includes the motor C‴ D‴.

As shown, the four motors are in series. By turning the cylinder of switch G until the brushes 22 and 23 rest upon the plates 15 and 16 the motors C D and C′ D′ remain in series with each other while such series is placed in parallel with the series composed of the two motors C″ D″ and C‴ D‴. By turning the switch still farther the brushes 20, 21, 24, and 25 bear upon the plates 13, 14, 17, and 18, and all four motors are connected in parallel with one another. The rheostatic switch or current regulator comprises a switch-arm H, a series of contacts H′, and a series of resistances H″, and is included in the supply-wire 33, leading from the trolley or from a storage-battery on the car or the like to the bearing 8 of switch G. The bearing 9 is grounded or connected with the return-conductor. The switch G might evidently be operated by means independently of the regulator-arm H, but a special improvement consists in connecting them so that they are operated together. To this end a sprocket-wheel 34, with an insulating web, is fast on one of the journals of the switch G, and is driven by a chain 35 from the sprocket-wheel 36, which turns with the arm H. Instead of the chain and sprocket-wheels other known or suitable power-transmitting devices could be used. It is evident that the switches G and H H' could be so arranged that the said switch G could make the change from series to multiple series or from multiple series to parallel in any desired position of the switch-arm H. As shown, the arrangement is such that the changes take place at an intermediate position of said arm H, and the motor-man cuts out resistances both before and after he effects said changes. In operation the motor-man turns on the current with all the resistances H'' in circuit and the motors in series, and proceeds to cut out the resistances until the contact 37 is reached. While the arm H is on this contact the switch G puts the motors in multiple series. Then more resistance is cut out until the arm H rests on the contact 38. Before the arm leaves this contact the switch G connects the motors in parallel, and during the further movement of the switches the rest of the resistances H'' are cut out.

The motor-man may use the switches so as to increase the current for starting under a heavy load, or if the car be started with the motors in series or in multiple series they may be used to increase the speed by diminishing the counter electro-motive force. The arrangement of the switches in such a way that the car may be started with the motors in series is important, because the motors then generate considerable counter electro-motive force almost from the start, and the car may be run at a slow speed with economy of current, owing to the greatness of said counter electro-motive force. When the car is to run more rapidly, the motors may with economy be connected in multiple series or in parallel, as each motor would then be generating a high counter electro-motive force.

The arrangement of the rheostatic switch so that it may cut out resistances before and after the switch G has changed the relation of the motors to one another enables the motor-man to graduate the speed or current in each of the relations provided for. It is possible to combine the contacts 37 and 38 and omit the intermediate resistances. Instead of having the switch G so arranged as to connect the series of motors C D and C' D' in parallel with the series C'' D'' and C''' D''', as described, it could be modified. Thus, as shown in Fig. III, it is arranged to connect the series composed of the motors C D and C'' D'' in parallel with the series C' D' and C''' D'''.

If it be desired to apply the switches to a car using only two motors, it is only necessary to omit the plates 11, 12, 15, 16, 17, and 18 and the corresponding brushes and to connect the wires leading to the motors with the brushes 19, 20, 21, and 26, respectively. This connection could be made without altering the switch G.

The use of the switches with two or more motors would be within the seventh to eleventh, inclusive, of the clauses of claim hereinafter written. Instead of having the commutating-switch G to connect the four motors successively in series, multiple series, and parallel, it is evident that the said switch could be arranged to establish any two of said relations by suitably altering the plates of the switch-cylinder. The combination of a commutating and rheostatic switch and operating means so arranged that one or more of its changes are effected by said commutating-switch in an intermediate position of the rheostatic switch is believed to be new, broadly, and is included generally in the twelfth clause of claim hereinafter written, irrespective of the number or character of the devices connected with the commutating-switch. The thirteenth clause of claim also extends to the combination generally, as therein explained, of the devices named therein.

Having fully described my invention, what I claim as new, and desire to secure by Letters Patent, is—

1. In combination with the wheel-base of a car and four or more propelling-motors, the rheostatic and commutating switches, the commutating-switch being adapted to connect the motors in series, in multiple series, and in paralell, and the rheostatic switch being arranged in a portion of the supply-circuit common to said motors, substantially as described.

2. In combination with the wheel-base of a car and four or more propelling-motors, the rheostatic and commutating switches, the commutating-switch being adapted to connect the motors in at least two of the three relations herein described—namely, series, multiple series, and parallel—and the rheostatic switch being arranged in a portion of the supply-circuit common to said motors, substantially as described.

3. In combination with the wheel-base of a car and four or more propelling-motors, the rheostatic and commutating switches and means whereby they are operated together, the commutating-switch being adapted to connect the motors in at least two of the three relations herein described—namely, series, multiple series, and parallel—and the rheostatic switch being arranged in a portion of the supply-circuit common to said motors, substantially as described.

4. In combination with the wheel-base of a car and four or more propelling-motors, the rheostatic and commutating switches and means whereby they are operated together, the commutating-switch being adapted to connect the motors in series, in multiple series, and in parallel, and the rheostatic switch being arranged in a portion of the supply-circuit common to said motors, and the operating means being moved in the same direction to cut out resistance and to change the relation of the motors from series to multiple series or parallel, substantially as described.

5. In combination with the wheel-base of a car and four or more propelling-motors, the rheostatic and commutating switches and means whereby they are operated together, the commutating-switch being adapted to connect the motors in at least two of the three relations herein described, namely—series, multiple series, and parallel—and the rheostatic switch being arranged in a portion of the supply-circuit common to said motors and adapted to cut out resistances both before and after one or more of the changes are effected by said commutating-switch, and the operating means being moved in the same direction to cut out resistance and to change the relation of the motors from series to multiple series or parallel or from multiple series to parallel, substantially as described.

6. In combination with the wheel-base of a car and four or more propelling-motors, the reversing, rheostatic, and commutating switches, the commutating-switch being adapted to connect the motors in series, in multiple series, and in parallel, and the rheostatic switch being arranged in a portion of the supply-circuit common to said motors, and said reversing-switches being included, respectively, in the loops between the motors and the said commutating-switch, substantially as described.

7. In combination with the wheel-base and propelling-motors of an electric car, the rheostatic and commutating switches, the commutating-switch being adapted to connect the motors in series and in parallel and the rheostatic switch being arranged in a portion of the supply-circuit common to said motors, substantially as described.

8. In combination with the wheel base and propelling-motors of an electric car, the rheostatic and commutating switches and means whereby they are operated together, the commutating-switch being adapted to connect the motors in series and in parallel and the rheostatic switch being arranged in a portion of the supply-circuit common to said motors, substantially as described.

9. In combination with the wheel base and propelling-motors of an electric car, the rheostatic and commutating switches and the operating means, the commutating-switch being adapted to connect the motors in series and parallel and the rheostatic switch being arranged in a portion of the supply-circuit common to said motors, and the operating means being moved in the same direction to cut out resistance and to change the relation of the motors from series to parallel, substantially as described.

10. In combination with the wheel base and propelling-motors of an electric car, the reversing, rheostatic, and commutating switches, and means whereby the said rheostatic and commutating switches are operated together, the commutating-switch being adapted to connect the motors in series and in parallel and the rheostatic switch being arranged in a portion of the supply-circuit common to said motors and adapted to cut out resistances both before and after the change is effected by said commutating-switch, and the operating means being moved in the same direction to cut out resistance and to change the relation of the motors from series to parallel, substantially as described.

11. In combination with the wheel-base and propelling-motors of an electric car, the reversing, rheostatic, and commutating switches, the commutating-switch being adapted to connect the motors in series and in parallel and the rheostatic switch being arranged in a portion of the supply-circuit common to said motors, and said reversing-switches being included in the loops between the motors and the said commutating-switch, substantially as described.

12. The combination of the rheostatic and commutating switches and means for operating them together, the combination and arrangement being such that one or more of the changes effected by said commutating-switch are made when the rheostatic switch is in an intermediate position, substantially as described.

13. The combination of the rheostatic switch, the commutating-switch in circuit therewith, and the reversing-switches in the loops from said commutating-switch, substantially as described.

In testimony whereof I have signed this specification in the presence of two subscribing witnesses.

S. H. SHORT.

Witnesses:
A. B. CALHOUN,
L. S. NOLD.